US012769492B2

(12) United States Patent
Narita

(10) Patent No.: US 12,769,492 B2
(45) **Date of Patent: *Oct. 20, 2026**

(54) INFORMATION PROCESSING DEVICE HAVING OS-STANDARD GENERAL-PURPOSE PRINTING PROGRAM INSTALLED THEREON THAT ENABLES THE DEVICE TO DISPLAY INFORMATION ON STATUS OF PRINTER

(71) Applicant: BROTHER KOGYO KABUSHIKI KAISHA, Nagoya (JP)

(72) Inventor: Kenju Narita, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/953,932

(22) Filed: Nov. 20, 2024

(65) Prior Publication Data

US 2025/0077144 A1 Mar. 6, 2025

Related U.S. Application Data

(63) Continuation of application No. 18/156,456, filed on Jan. 19, 2023, now Pat. No. 12,197,799.

(30) Foreign Application Priority Data

Jan. 27, 2022 (JP) ................................ 2022-010928

(51) Int. Cl.
*G06F 3/12* (2006.01)

(52) U.S. Cl.
CPC .......... *G06F 3/1256* (2013.01); *G06F 3/1203* (2013.01); *G06F 3/1228* (2013.01);
(Continued)

(58) Field of Classification Search
CPC .... G06F 3/1256; G06F 3/1203; G06F 3/1228; G06F 3/1232; G06F 3/1234
See application file for complete search history.

(56) References Cited

U.S. PATENT DOCUMENTS

2005/0018236 A1 1/2005 Shirai et al.
2006/0056872 A1 3/2006 Hosoi
(Continued)

FOREIGN PATENT DOCUMENTS

JP 2001113792 A 4/2001
JP 2003108355 A 4/2003
(Continued)

OTHER PUBLICATIONS

International Search Report and a Written Opinion dated Apr. 4, 2023 in related International Application No. PCT/JP2023/001130.
(Continued)

*Primary Examiner* — Nicholas Pachol
(74) *Attorney, Agent, or Firm* — Scully, Scott, Murphy & Presser, P.C.

(57) ABSTRACT

A non-transitory computer-readable storage medium stores a support program for an information processing device connectable to a printer. The information processing device includes: a display; a computer; and a memory. The memory stores an operating system in which a general-purpose printing program corresponding to the printer and supported by the support program is embedded. The general-purpose printing program is configured to manage data for displaying a print settings screen on the display. The support program, when executed by the computer, causes the information processing device to perform: when a request is issued from the general-purpose printing program in response to the printer being selected: acquiring; generating; and transferring. The acquiring acquires status information indicating a status of the printer. The generating generates notification
(Continued)

data indicating a notification content to be provided to a user. The transferring transfers the notification data to display the notification content on the print settings screen.

8 Claims, 8 Drawing Sheets

(52) U.S. Cl.
CPC .......... *G06F 3/1232* (2013.01); *G06F 3/1234* (2013.01); *G06F 3/1284* (2013.01)

(56) References Cited

U.S. PATENT DOCUMENTS

| | | | |
|---|---|---|---|
| 2009/0237732 | A1 | 9/2009 | Kuroda et al. |
| 2010/0182627 | A1 | 7/2010 | Yamamichi |
| 2011/0194141 | A1 | 8/2011 | Sweet et al. |
| 2011/0261396 | A1 | 10/2011 | Takahashi |
| 2015/0138589 | A1 | 5/2015 | Minagawa |
| 2017/0223210 | A1 | 8/2017 | Yamada |
| 2020/0174727 | A1 | 6/2020 | Yamada |
| 2020/0249890 | A1 | 8/2020 | Kakitsuba |
| 2020/0310720 | A1 | 10/2020 | Kakitsuba |
| 2021/0117135 | A1 | 4/2021 | Suzuki |
| 2022/0137902 | A1 | 5/2022 | Ogawa |
| 2022/0357902 | A1 | 11/2022 | Sato |
| 2023/0236776 | A1 | 7/2023 | Narita |

FOREIGN PATENT DOCUMENTS

| | | | |
|---|---|---|---|
| JP | 2005044080 | A | 2/2005 |
| JP | 2017134718 | A | 8/2017 |
| JP | 2020126319 | A | 8/2020 |
| JP | 2020-160989 | A | 10/2020 |
| JP | 2021121898 | A | 8/2021 |

OTHER PUBLICATIONS

Office Action dated Aug. 29, 2023 received in U.S. Appl. No. 18/156,456.
Office Action dated Feb. 29, 2024 received in U.S. Appl. No. 18/156,456.
Notice of Allowance dated Aug. 22, 2024 received in U.S. Appl. No. 18/156,456.

FIG. 6
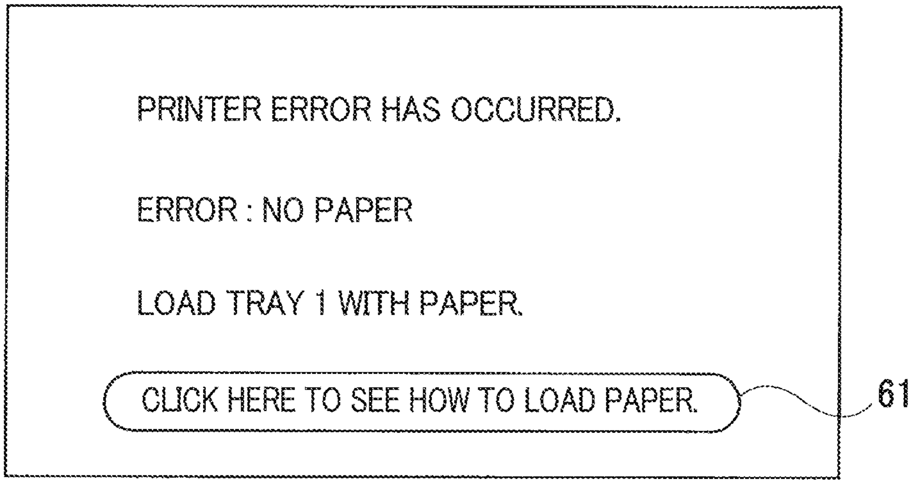
FIG. 7
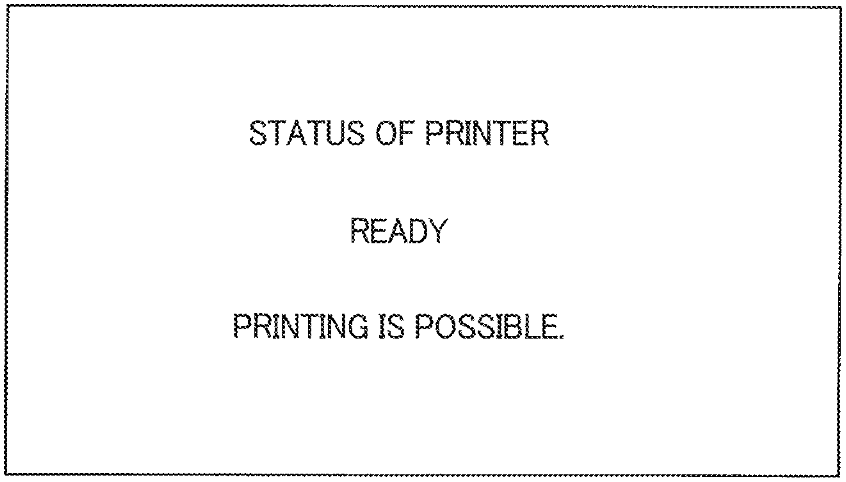
FIG. 8
| ORDER OF PRIORITY | STATUS |
|---|---|
| 1 | FAILURE |
| 2 | PAPER JAM, NO PAPER, NO COLORANT, COVER OPEN |
| 3 | LOW COLORANT LEVEL |
| 4 | PASSWORD UNCHANGED |

INFORMATION PROCESSING DEVICE HAVING OS-STANDARD GENERAL-PURPOSE PRINTING PROGRAM INSTALLED THEREON THAT ENABLES THE DEVICE TO DISPLAY INFORMATION ON STATUS OF PRINTER

REFERENCE TO RELATED APPLICATIONS

This application is a continuation application of U.S. application Ser. No. 18/156,456 filed on Jan. 19, 2023, which claims priority from Japanese Patent Application No. 2022-010928 filed on Jan. 27, 2022. The entire content of the priority application is incorporated herein by reference.

BACKGROUND ART

A widely known technology for controlling printers with a personal computer or other information processing device is configured of a printer driver installed on the information processing device to generate print data and to transmit that print data to the printer (Japanese Patent Application Publication No. 2017-134718, for example). The printer driver is provided by the manufacturer of the printer to support the various functions possessed by that printer in order that the printer can be fully utilized.

DESCRIPTION

In recent years, practical technologies have been developed for controlling printers without the use of the printer driver described above. One such technology utilizes a general-purpose printing program that is embedded in the operating system (abbreviated "OS") as standard. With this technology, the OS, upon detecting a printer, associates the printer with the OS-standard general-purpose printing program. Thereafter, when a print command is received for that printer, the OS-standard general-purpose printing program can control printing without the need of a printer driver.

However, among conventional image processing devices that use an OS-standard general-purpose printing program, there is no known configuration for displaying information on the status of a printer before a print command is issued. Consequently, since the user may issue a print command without knowing that a paper jam or other error has occurred in the printer, the conventional technology has room for improvement.

In order to attain the above and other object, according to one aspect, the present disclosure provides a non-transitory computer-readable storage medium storing a support program for an information processing device connectable to a printer. The information processing device includes: a display; a computer; and a memory. The memory stores an operating system in which a general-purpose printing program corresponding to the printer is embedded. The general-purpose printing program is configured to manage data for displaying a print settings screen on the display. The support program supports the general-purpose printing program. The support program, when executed by the computer, causes the information processing device to perform: when a request to perform a process is issued from the general-purpose printing program in response to the printer being selected: (a) acquiring; (b) generating; and (c) transferring. The (a) acquiring acquires status information indicating a status of the printer. The (b) generating generates notification data indicating a notification content to be provided to a user. The (c) transferring transfers the notification data generated in the (b) generating to display the notification content based on the notification data on the print settings screen displayed on the display.

The support program described in the present specification acquires status information for a printer when the printer is selected, generates notification data based on the status information, and passes the notification data to a general-purpose printing program to enable the general-purpose printing program to display the notification data on a print settings screen. This enables an information processing device that uses the OS-standard general-purpose printing program to display information related to the status of the printer prior to a print command being inputted. As a result, the user can learn the information related to the status of the printer prior to inputting the print command on the information processing device.

A printing system that includes an information processing device on which the support program is installed, a computer-readable storage medium for storing the support program, a control method for implementing the functions of the support program, the support program, and a printer are all novel and useful.

The present specification describes a technology employed on an information processing device having an OS-standard general-purpose printing program installed thereon that enables the device to display information related to a status of a printer before the user issues a print command.

FIG. 6 is an explanatory diagram illustrating an example of a notification image.

FIG. 7 is an explanatory diagram illustrating another example of the notification image.

FIG. 8 is an explanatory diagram illustrating an example of an order of priority.

Below, a personal computer (hereinafter referred to as "PC") 1 using a support program according to the present embodiment will be described while referring to the accompanying drawings. This specification describes the support program executed by the PC 1.

Figure 1:
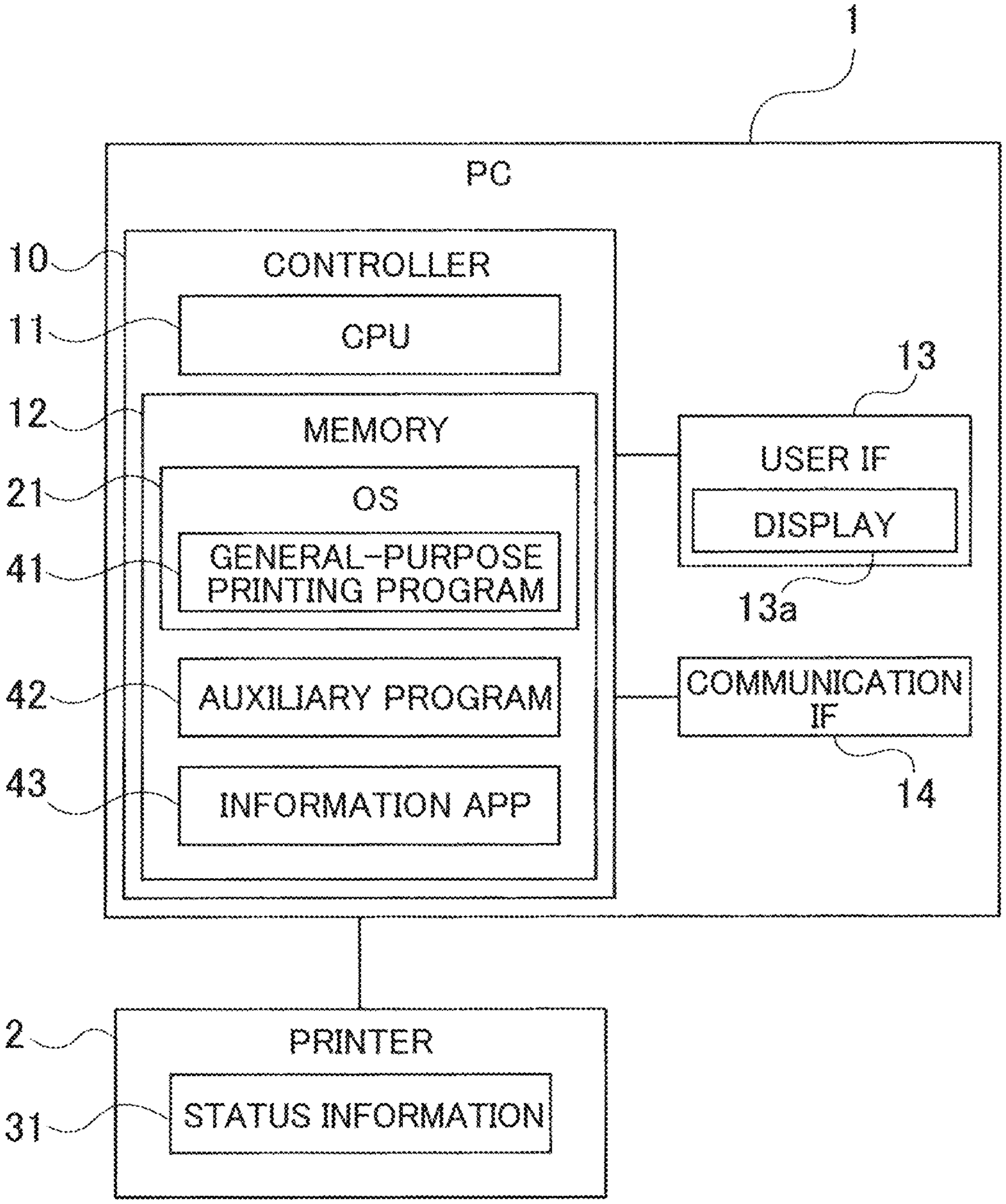
FIG. 1 is a block diagram illustrating the schematic electrical configuration of a personal computer.

As illustrated in FIG. 1, the PC 1 of this embodiment is provided with a controller 10 that includes a CPU 11 and a memory 12. The PC 1 is an example of the information processing device of the present disclosure. The CPU 11 is an example of the computer of the present disclosure. The PC 1 is also provided with a user interface (also described as "user IF") 13 and a communication interface (also described as "communication IF") 14, both of which are electrically connected to the controller 10. Note that the controller 10 in FIG. 1 is a general concept that covers all hardware and software used for controlling the PC 1 and is not actually limited to a single piece of hardware present in the PC 1.

The CPU 11 executes various processes according to programs read from the memory 12 or based on user operations. The memory 12 stores various programs and various data. The memory 12 is also used as a work area for executing various processes. Examples of the memory 12 may be a ROM, a RAM, a hard disk drive, and the like built into the PC 1 or may be any storage medium that is readable and writable by the CPU 11, such as a CD-ROM, a DVD-ROM, or other storage media. A buffer provided in the CPU 11 is another example of the memory.

The user interface 13 includes hardware that displays screens for reporting information to the user, and specifically a display 13*a*, and hardware that receives operations performed by the user. The user interface 13 may be a set of devices that includes the display 13*a* for displaying information, and a mouse, keyboard, and the like with input-receiving functions. Alternatively, the user interface 13 may be a touchscreen that is provided with both the display 13*a* and an input-receiving function.

The communication interface 14 includes hardware for communicating with an external device, such as a printer 2. The communication standard employed by the communication interface 14 may be Ethernet (registered trademark), Wi-Fi (registered trademark), Universal Serial Bus (abbreviated "USB"), or the like. "Ethernet" is a Japanese registered trademark of FUJIFILM Business Innovation Corp. "Wi-Fi" is a Japanese registered trademark of Wi-Fi Alliance. The PC 1 may be capable of connecting to the Internet via the communication interface 14. Alternatively, the PC 1 may be provided with a plurality of communication interfaces 14 supporting a plurality of communication standards.

As illustrated in FIG. 1, the memory 12 of the PC 1 stores an operating system (hereinafter abbreviated "OS") 21, an auxiliary program 42, and various application programs (hereinafter abbreviated "apps"). The OS 21 includes a general-purpose printing program 41. The OS 21 is one of Windows (registered trademark), macOS (registered trademark), Linux (registered trademark), iOS (registered trademark), and Android (registered trademark), for example. "Windows" is a Japanese registered trademark of Microsoft Corporation. "macOS" is a Japanese registered trademark of Apple Inc. "Linux" is a Japanese registered trademark of Linus Torvalds. "iOS" is a Japanese registered trademark of Cisco Technology Inc. "Android" is a Japanese registered trademark of Google Inc. The auxiliary program 42 is an example of the support program of the present disclosure.

Among the various apps installed on the PC 1 of the present embodiment is an information app 43. The information app 43 is a map app, calendar app, or a browser, for example. The information app 43 has a function for displaying various information on the display 13*a* in response to user requests. The information app 43 is an example of the application program of the present disclosure. The information app 43 itself may also be provided with a function for printing displayed information.

The general-purpose printing program 41 is an OS-standard program provided together with the OS 21 and functions to print on the printer 2 or the like information displayed on the display 13*a* by the information app 43 and the like. The general-purpose printing program 41 in the present embodiment includes a function for generating intermediate image data based on the image data to be printed. The general-purpose printing program 41 supports functions that are universally available on printers of a plurality of models provided by various printer vendors. Unlike printer drivers designed for specific types of printers, the general-purpose printing program 41 does not support all functions that are specific to all of the various printers, but rather limits support to general functions available on all printers.

The auxiliary program 42 is a program or a set of programs that executes processes based on commands from the OS 21 in conjunction with processes of the general-purpose printing program 41 and provides control support for the target hardware. The auxiliary program 42 of the present embodiment supports the model of printer 2 connected to the PC 1. The auxiliary program 42 is started from the general-purpose printing program 41 when the OS 21 receives a command to execute a print on the printer 2 using the general-purpose printing program 41, for example. The auxiliary program 42 is called a Print Support Application (abbreviated "PSA") or a Hardware Support Application (abbreviated "HSA").

The auxiliary program 42 may be a combination of programs, each of which receives execution instructions, or may be a single program that can execute different processes according to the received instructions. The vendors of printers may prepare an auxiliary program for each type of printer. For example, one auxiliary program may be prepared for inkjet printers and another auxiliary program may be prepared for laser printers. Alternatively, an auxiliary program may be prepared for each model of printer or for each model series rather than for each type of printer.

When a new printer is connected to the PC 1, for example, the OS 21 of the PC 1 can download the appropriate auxiliary program from a server or the like based on the type or model of the connected printer and can install this program on the PC 1. The OS 21 stores identification information for the installed auxiliary program in the memory 12 in association with printer information for the newly connected printer.

As illustrated in FIG. 1, the PC 1 in the present embodiment is connected to a printer 2. The printer 2 is a device that possesses at least a print function and a communication function.

In the present embodiment, the printer 2 stores status information 31 indicating the current status of the printer 2. Statuses of the printer 2 are "ready," "printing," "error," and "warning," for example. "Ready" indicates that the printer 2 is waiting for a print job. "Error" indicates a state in which the printer 2 cannot print. "Warning" indicates a state in which the printer 2 can print but the user is cautioned that the printer 2 may soon be unable to print.

When the status of the printer 2 is either "error" or "warning," the status information 31 includes more detailed information. For example, when the status is "error," the status information 31 may include such detailed information as type information indicating the type of error (error type), guidance information indicating how the error can be resolved, and contact information indicating the contact person in charge. The type information may indicate error types such as "malfunction," "paper jam," "no paper," "no colorant," and "cover open." When the status is "warning," the type information included in the status information 31 specifies warning types such as "low colorant level," and "password unchanged." "Password unchanged" includes both the case in which the password has not been changed from the initial password and cases in which the same password has been used for a long time.

Next, a printing procedure including the operations of the auxiliary program 42 according to the present embodiment that is performed when "Print" has been selected in the information app 43 will be described with reference to the sequence chart of FIG. 2. Note that FIG. 2 and other sequence diagrams described later illustrate operations performed when an auxiliary program 42 compatible with the printer 2 is installed on the PC 1.

The processes in the present embodiment and process steps in the flowcharts essentially indicate processes performed by the CPU 11 according to instructions described in the auxiliary program 42 and other programs. Processes performed by the CPU 11 include hardware control using the API in the OS 21. However, a detailed description of the role of the OS 21 is omitted in this specification when describing operations in the programs. Further, "acquire" is used as a concept that does not necessarily require a request.

Figure 2:
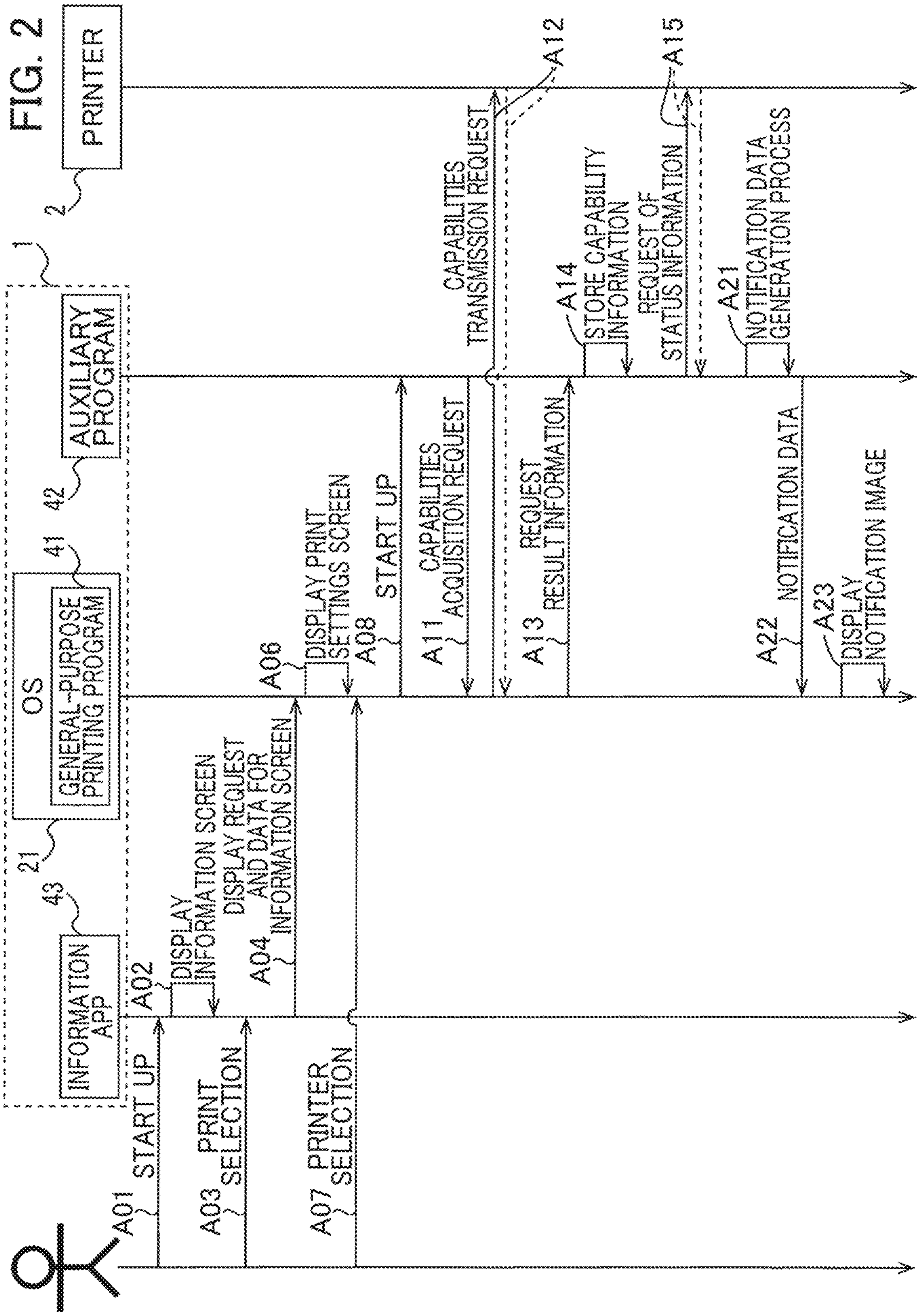
FIG. 2 is a sequence chart illustrating steps showing an example of an operating procedure performed when print has been selected.
Figure 3:
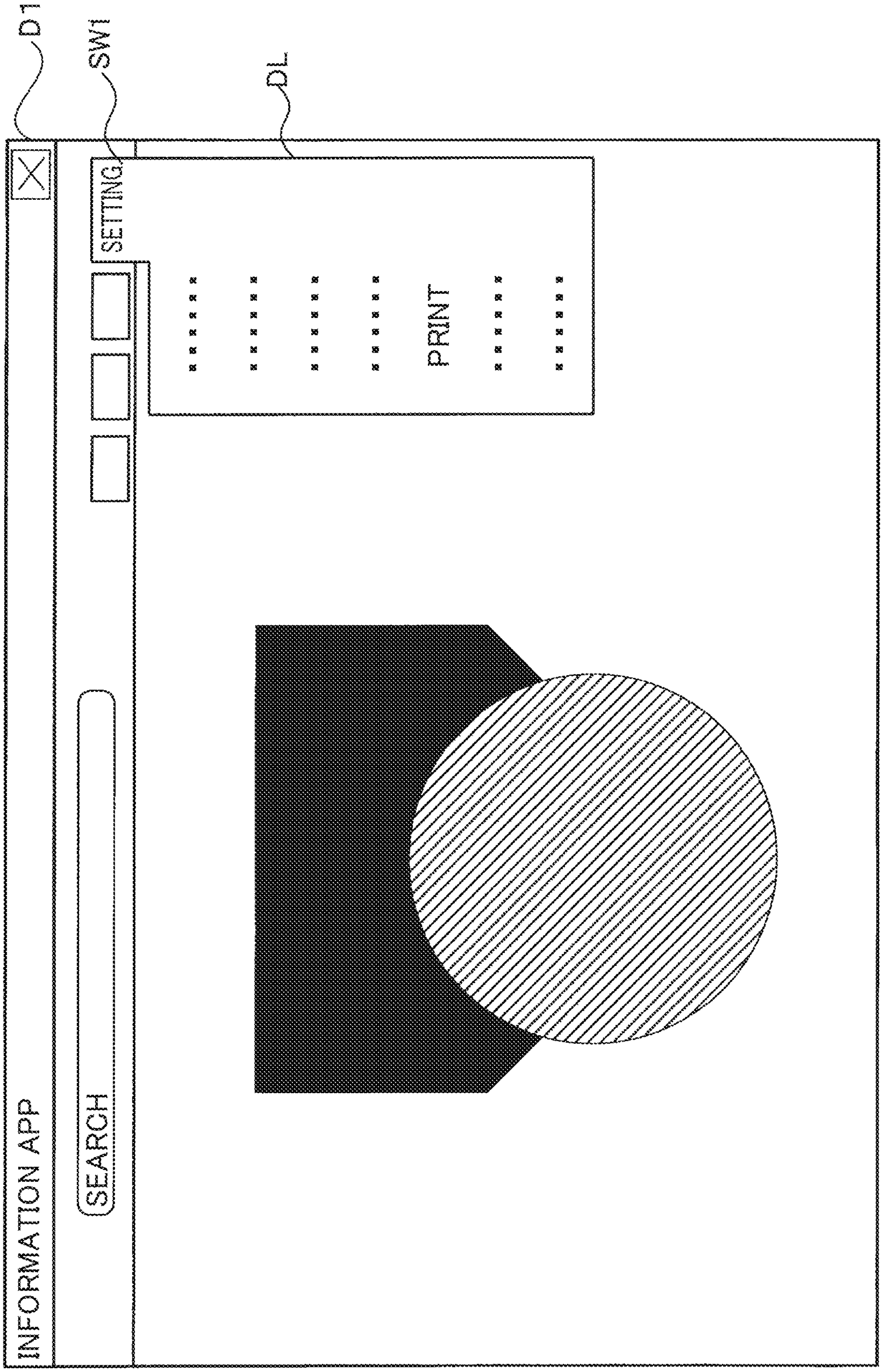
FIG. 3 is an explanatory diagram illustrating an example of an information screen.

In A01 at the beginning of the procedure in FIG. 2, the user starts up the information app 43. In A02 the information app 43 displays an information screen that includes various information on the display 13*a* in response to user instructions. When the user wishes to print an image of the information screen displayed on the display 13*a*, in A03 the user selects "Print" in the information screen. FIG. 3 illustrates an example of an information screen D1 that includes a Settings button SW1. When the user selects the Settings button SW1 through an operation, a pull-down menu DL that includes "Print" is displayed in the information screen D1, as illustrated in FIG. 3. When the user selects "Print" in the pull-down menu DL, in A04 the information app 43 passes a display request and data for the information screen to the general-purpose printing program 41 of the OS 21.

Figure 4:
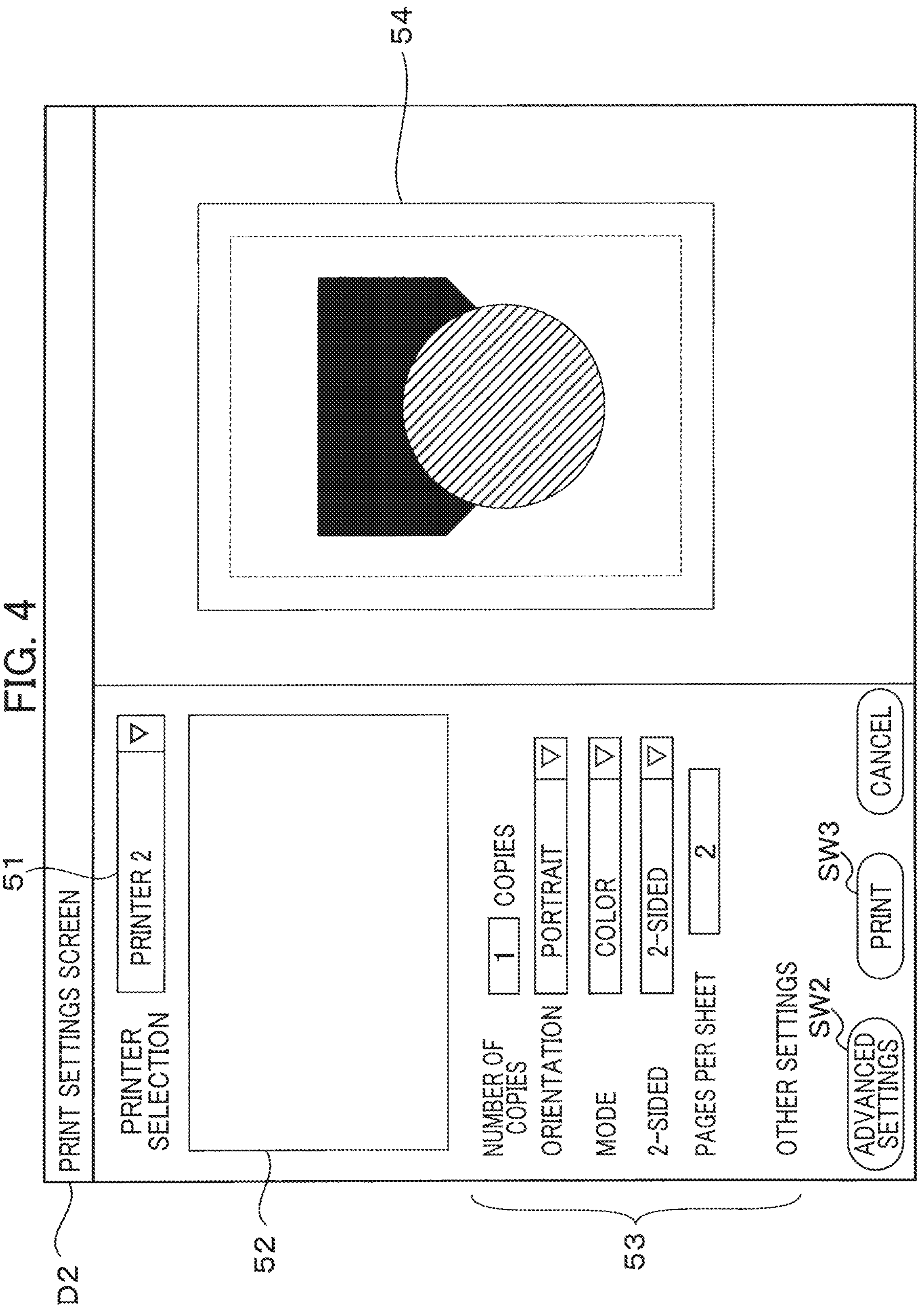
FIG. 4 is an explanatory diagram illustrating an example of a print settings screen.

In A06 the general-purpose printing program 41 displays a print settings screen on the display 13*a* in response to the request. Through the print settings screen, the general-purpose printing program 41 accepts commands to modify print settings and to execute a print. FIG. 4 illustrates an example of a print settings screen D2. The print settings screen D2 includes a printer selection menu 51 that receives a printer selection, a notification area 52 that displays a notification image, a print settings area 53 that accepts specifications for various print settings, a preview area 54 that includes an image to be printed, an Advanced Settings button SW2 that accepts a command to perform advanced print settings, and a Print button SW3 that accepts a command to execute a print. The notification image displayed in the notification area 52 shows notification content of which the user is to be informed. The general-purpose printing program 41 can manage data for displaying the print settings screen D2.

In A07 the user can select a printer in the displayed print settings screen D2 through an operation on the printer selection menu 51. When the selected printer is the printer 2, in A08 the general-purpose printing program 41 starts up the auxiliary program 42 that supports the printer 2 and requests the auxiliary program 42 to perform a process corresponding to the printer selection. In A08 the general-purpose printing program 41 also passes to the auxiliary program 42 information on the selected printer and information on print settings that has been set when the printer is selected.

When the printer 2 has been set as the default printer of the OS 21, in A06 the general-purpose printing program 41 displays the print settings screen D2 with the printer 2 already selected, as illustrated in FIG. 4, and in A08 starts up the auxiliary program 42. In other words, the OS 21 automatically selects the printer 2, and the general-purpose printing program 41 executes the process of A08 based on information on the selected printer 2. In this case, the user operation in A07 is unnecessary.

Rather than the general-purpose printing program 41 displaying the print settings screen D2, the information app 43 may be configured to display the print settings screen D2. In this case, the information app 43 starts up the general-purpose printing program 41 in response to "Print" being selected in A03, acquires data for displaying the print settings screen D2 from the general-purpose printing program 41, and displays the print settings screen D2 on the display 13*a*. When the printer 2 has already been selected in the print settings screen D2 or when the printer 2 is selected in A07, the information app 43 passes information on the selected printer 2 to the general-purpose printing program 41. In this way, the general-purpose printing program 41 starts up the auxiliary program 42 supporting the printer 2 in A08.

Once the auxiliary program 42 is started up, in A11 the auxiliary program 42 outputs a capabilities acquisition request to the OS 21 requesting capability information for the printer 2. Upon receiving the capabilities acquisition request from the auxiliary program 42, in A12 the OS 21 transmits a capabilities transmission request to the printer 2 requesting capability information and receives capability information from the printer 2. When the printer 2 receives a capabilities transmission request from the general-purpose printing program 41 of the OS 21, the printer 2 transmits the capability information indicating the capabilities of the printer 2 to the general-purpose printing program 41.

In A13 the OS 21 transfers the capability information received from the printer 2 to the auxiliary program 42. In A14 the auxiliary program 42 stores the capability information received from the OS 21 in a prescribed area of the memory 12 that is accessible to the auxiliary program 42. When capability information has already been stored in the memory 12, the auxiliary program 42 overwrites the stored capability information with the new capability information.

The OS 21 communicates with the printer 2 according to the Internet Printing Protocol (hereinafter abbreviated "IPP"), for example. Note that rather than sending a request to the OS 21, the auxiliary program 42 may acquire the capability information directly from the printer 2 using a management information base (abbreviated "MIB"), for example.

Capability information acquired from the printer 2 includes information on the possible parameters that can be specified in print settings, as well as information on the residual quantities of consumables, information on mounted trays, paper information on the paper loaded in each tray, and information on supported print resolutions, for example. The printer 2 may also have functions to process images based on incoming print jobs and to execute a print based on the processed data. For example, the printer 2 may have functions to perform multiple page printing such as N-in-1 printing, composite printing with watermarks or the like, and economic printing for saving colorant. When the printer 2 possesses image processing functions that can be applied, the printer 2 may pass information on these functions to the OS 21 as capability information.

In A15 the auxiliary program 42 further requests the printer 2 for a status notification and acquires the status information 31 from the printer 2 in response. The auxiliary program 42 acquires the status of the printer 2 based on the status information 31 received from the printer 2. The request of the status information 31 transmitted to the printer 2 is an example of the status transmission request of the present disclosure. The process of A15 is an example of the (a) acquiring of the present disclosure.

Note that the printer 2 may have two or more statuses at the same time. In such cases, the printer 2 transmits all statuses in the status information 31. In other words, the status information 31 that the auxiliary program 42 acquires in A15 may include information indicating a plurality of statuses.

The status information 31 may also be included in the capability information. In this case, the auxiliary program 42 can acquire the status information 31 from the capability information received in A13. In this case, the process of A11 and A12 is an example of the (a) acquiring of the present disclosure. When the status information 31 is included in the capability information, the auxiliary program 42 need not issue the request in A15. Further, rather than directly requesting the status information 31 from the printer 2, the auxiliary program 42 may request the OS 21 to acquire the status information 31 by issuing a separate request from the request for capability information.

The process of acquiring the status information 31 is simpler when the auxiliary program 42 acquires the status information 31 directly from the printer 2 than when the auxiliary program 42 acquires the status information 31 together with the capability information since the auxiliary program 42 need not extract the status information 31 from the capability information in the former case. Further, since the auxiliary program 42 can acquire the status information 31 at a timing different from the timing for acquiring the capability information, the auxiliary program 42 has more flexibility in the timing at which the status information 31 is acquired. By contrast, when the general-purpose printing program 41 is requested to acquire the status information 31 from the printer 2 together with the capability information, the processing load on the PC 1 for communicating with the printer 2 is less than if the status information 31 were acquired separately from the capability information.

In A21 the auxiliary program 42 executes a notification data generation process based on the status information 31 acquired in A15. In the notification data generation process, the auxiliary program 42 generates notification data representing a notification image to be displayed in the notification area 52 of the print settings screen D2. Notification images to be displayed in the notification area 52 may include one or a combination of text, a still image, a video, and an object having a link with an embedded URL, for example. The object may be displayed in the form of text, a button, or a banner. This notification data generation process will be described later in greater detail.

In A22 the auxiliary program 42 transfers display information including the generated notification data and information on values of print settings based on the capability information to the general-purpose printing program 41 and subsequently ends the process. In A23 the general-purpose printing program 41 displays a notification image in the notification area 52 of the print settings screen D2 displayed on the display 13*a* based on the display information received from the auxiliary program 42. In addition to displaying the notification image in the notification area 52, in A23 the general-purpose printing program 41 displays information in the print settings area 53 indicating initial values of the print settings based on the capability information of the printer 2. The process of A22 is an example of the (c) transferring of the present disclosure. Note that when the information app 43 is configured to display the print settings screen D2, the information app 43 may receive the notification data in A22 and display the notification image in the notification area in A23.

FIG. 4 illustrates one example of a print settings screen D2 that includes a single notification area 52, but the arrangement, shape, size, number, and the like of the notification areas 52 is not limited to this example. The auxiliary program 42 may acquire information on the notification area 52 from the general-purpose printing program 41 and may set the notification data to be displayed in the notification area 52 based on the acquired information. When, for example, there are multiple layouts in which the notification area 52 can be displayed and the auxiliary program 42 can specify the display location, the auxiliary program 42 may transfer notification data that includes information specifying this display location to the general-purpose printing program 41. Further, when the size of the notification area 52 can be selected, the auxiliary program 42 may transfer information specifying this size to the general-purpose printing program 41.

Next, steps in the notification data generation process executed in A21 will be described with reference to the flowchart in FIG. 5. The CPU 11 of the PC 1 executes this notification data generation process based on the description in the auxiliary program 42.

In S101 at the beginning of the notification data generation process, the CPU 11 determines the status type of the printer 2 based on the status information 31 included in the capability information that the CPU 11 acquired in A13 of FIG. 2. When the status information 31 includes a plurality of statuses, the CPU 11 targets each status sequentially to determine the status type.

When the target status is "error" (S101: ERROR), in S103 the CPU 11 stores error information in a storage area accessible to the auxiliary program 42. The CPU 11 stores such error information as the type of error (error type), detailed information of the error type, and the date and time the error occurred or the date and time the status information 31 was acquired in association with identification information for the printer 2.

In S104 the CPU 11 adds an error notification to the notification content. Here, an error notification is a message notifying the user of the error. In S105 the CPU 11 determines on the basis of the detailed information included in the status information 31 whether the error is a type of error that the user can resolve. Specifically, the CPU 11 reaches a NO determination in S105 when the error type is "failure." The CPU 11 reaches a YES determination in S105 when the error type is "paper jam," "no paper," "no colorant," or "cover open," for example.

When the CPU 11 determines that the error cannot be resolved by the user (S105: NO), in S106 the CPU 11 adds contact information to the notification content specifying the contact person for a service call. However, when the CPU 11 determines that the error can be resolved by the user (S105: YES), in S107 the CPU 11 adds guidance information to the notification content indicating the procedure for resolving the error. Providing this guidance information for resolving the error increases the possibility of the user resolving the error quickly.

The auxiliary program 42 is provided with an error notification message for each type of error. In S104 the CPU 11 selects the message to be used for notifying the user based on the type of error. The error notification, contact information, guidance information, and the like may be included in the status information 31, may be stored in the auxiliary program 42, or may be acquired from the printer 2, a server, or other external device. The guidance information and contact information may be configured as objects having a link with an embedded URL to a web page.

FIG. 6 illustrates an example of a notification image that includes an error notification and guidance information. The notification image in this example is used when a "no paper" error has occurred and includes a button 61 having a link with an embedded URL to a web page showing how to load the paper. When the CPU 11 displays a notification image including an error notification in the notification area 52 of the print settings screen D2, the user can easily understand through the print settings screen D2 that an error has occurred in the printer 2.

When the CPU 11 determines in S101 that the target status is "warning" (S101: WARNING), in S111 the CPU 11 adds a warning notification, which is a message for warning the user, and detailed information about the warning to the notification content. In this case, the detailed information is information specifying the type of warning (waning type), the method of handling the warning, and the like, for example.

When the CPU 11 determines that the target status is neither "error" nor "warning" (S101: OTHER), in S121 the CPU 11 adds a status notification constituting a message for notifying the user of the status to the notification content. FIG. 7 illustrates an example of a notification image that includes a status notification. When the CPU 11 displays a notification image that includes a status notification in the notification area 52 of the print settings screen D2, the user can easily understand the status of the printer 2 through the print settings screen D2.

After completing any of the processes in S106, S107, S111, and S121, in S131 the CPU 11 determines whether the acquired status information 31 includes another status. When there remain any statuses for which the determination of S101 has not been performed (S131: YES), the CPU 11 returns to S101 and sets the next status as the determination target.

Once the CPU 11 determines that all statuses in the status information 31 have been processed (S131: NO), in S132 the CPU 11 generates notification data representing the image to be displayed in the notification area 52 based on the added notification content. The process of S132 is an example of the (b) generating of the present disclosure.

When the status information 31 includes a plurality of statuses and the CPU 11 has added information for a plurality of notifications to the notification content, the CPU 11 gives precedence to information on statuses with higher priority over information on statuses with lower priority according to an order of priority stored in the auxiliary program 42, for example. FIG. 8 illustrates an example of the order of priority with failures having the highest priority, followed by error states that prevent printing from being performed. Warnings have a lower priority than errors.

For prioritization, notifications with higher priority may be displayed at the top or initial position in the notification area 52, displayed in large characters, displayed in color, displayed with added borderlines around the notification, or displayed in a flashing state, for example. The CPU 11 may generate notification data showing all added notification content arranged with one notification after another in a single image or may generate notification data representing an animated image in which notification content is changed in sequence.

When information on more than one status has been added to the notification content, the CPU 11 need not notify the user of information on statuses with low priority. Further, if no notification content has been added due to an inability to acquire the status or some other reason, the CPU 11 may generate notification data in which the notification area 52 is blank or may generate notification data showing a prepared image, such as the logo of or latest information on the vender.

In S133 the CPU 11 determines whether the current status information 31 contains a status indicating an error. When the status information 31 includes no error statuses (S133: NO), in S134 the CPU 11 deletes any error information that has been stored in the memory 12. After completing the process in S134 or when the CPU 11 determines in S133 that the status information 31 does not include a status indicating an error (S133: YES), the CPU 11 ends the notification data generation process and returns to the process in the sequence chart of FIG. 2.

As indicated in A22 of FIG. 2, the auxiliary program 42 passes the notification data generated in S132 to the general-purpose printing program 41. As a result, a notification image based on the notification data is displayed in the notification area 52 of the print settings screen D2 in A23. In other words, an image is displayed in the print settings screen D2 based on notification data generated by the auxiliary program 42.

Instead of generating notification data and passing the notification data to the general-purpose printing program 41, the auxiliary program 42 itself can display the information. However, this would require that the auxiliary program 42 display a screen separate from the print settings screen D2, complicating the display and potentially causing the user stress. Having the general-purpose printing program 41 of the OS 21 display this information in the print settings screen D2 simplifies the display and avoids causing the user stress.

While the print settings screen D2 illustrated in FIG. 4 is displayed, the user may performs operations to modify print settings in the print settings area 53 of the print settings screen D2. Next, the procedure performed by each program when the general-purpose printing program 41 receives commands to modify print settings in the print settings area 53 will be described with reference to the sequence chart in FIG. 9. As described above, the print settings screen D2 can receive commands to modify print settings through operations in the print settings area 53 and commands to execute a print through an operation on the Print button SW3.

In B01 the user performs operations to modify print settings. On the basis of the modification commands, in B02 the general-purpose printing program 41 modifies the content displayed in the print settings area 53 of the print settings screen D2. When print settings have been modified, the general-purpose printing program 41 also starts up the auxiliary program 42 and issues a request to the auxiliary program 42 to perform a process corresponding to the modified print settings. In B03 the auxiliary program 42 receives information on the modified print settings from the general-purpose printing program 41.

In response to being started up due to a change in the print settings, in B04 the auxiliary program 42 determines whether error information is stored in the memory 12. Error information is information that has been stored in the memory 12 in S103 of the notification data generation process described above and indicates that the previously acquired status information 31 has contained an error.

When the auxiliary program 42 determines that error information is stored in the memory 12 (alt: ERROR INFORMATION EXISTS), in B12 the auxiliary program 42 issues a request to the printer 2 for the status information 31 and acquires the status information 31 from the printer 2. The auxiliary program 42 acquires the current status of the printer 2 based on this status information 31. The process in B12 is identical to the process in A15 described above. The process of B12 is an example of the (a) acquiring of the present disclosure. Note that the auxiliary program 42 may acquire the status information 31 via the OS 21 in B12.

Figure 5:
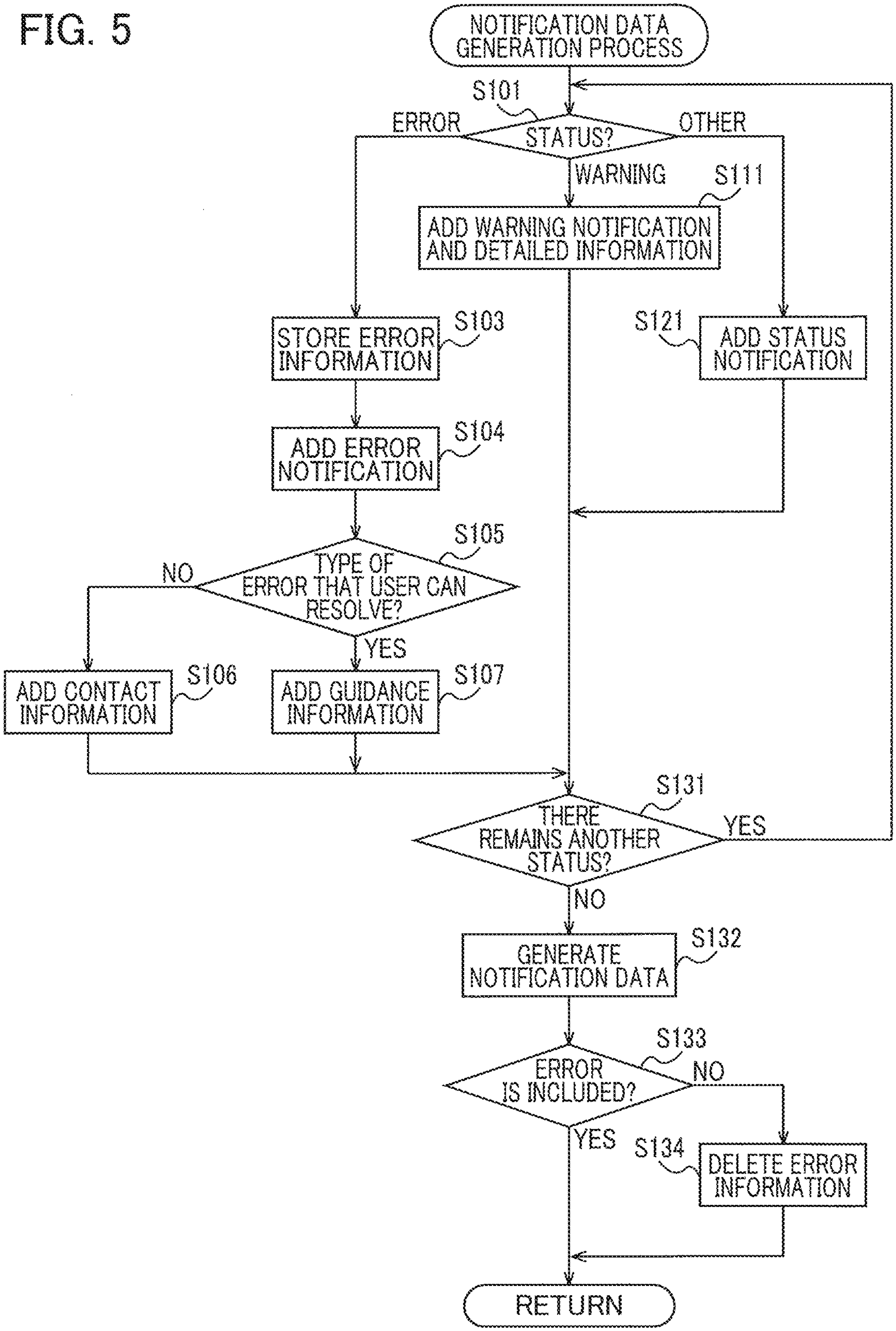
FIG. 5 is a flowchart illustrating steps in a notification data generation process.

In B14 the auxiliary program 42 repeats the notification data generation process illustrated in FIG. 5 based on the current status. In the notification data generation process performed in B14, the process S132 is also an example of the (b) generating of the present disclosure. In B15 the auxiliary program 42 transfers the notification data generated in the notification data generation process of B14 to the general-purpose printing program 41, and subsequently ends the process. The process of B15 is an example of the (c) transferring of the present disclosure.

In B21 the general-purpose printing program 41 updates the notification image displayed in the notification area 52 of the print settings screen D2 based on the notification data received from the auxiliary program 42. The general-purpose printing program 41 can still accept modifications to print settings through user operations in the updated print settings screen D2 displayed in B21. When commands to modify print settings are received in the newly displayed print settings screen D2, the general-purpose printing program 41 repeats the procedure in the sequence chart of FIG. 9.

In a case where notification data has not been received from the auxiliary program 42, the general-purpose printing program 41 need not change the display in the notification area 52 or may leave the notification area 52 blank when updating the display of the print settings screen D2. In a case where the display is not changed, the auxiliary program 42 need not transfer notification data to the general-purpose printing program 41 in B15 when the notification data generated in B15 is the same as the notification data generated in the notification data generation process of A21. Alternatively, in a case where the same error has occurred again, the auxiliary program 42 may transfer notification data to the general-purpose printing program 41 for displaying the error with more emphasis than before.

On the other hand, when the auxiliary program 42 determines in B04 that no error information is stored in the memory 12, the auxiliary program 42 does not execute the process from B12 to B21 and simply notifies the general-purpose printing program 41 that the process has ended. In this case, the notification image displayed in the notification area 52 is left unchanged. Since the auxiliary program 42 does not reacquire the status information 31 when no error has occurred, the processing load on the auxiliary program 42 is less.

Note that the auxiliary program 42 may reacquire the status information 31 and re-execute the notification data generation process even when no error data is stored. However, the processing load on the auxiliary program 42 for communicating with the printer 2 is increased when the auxiliary program 42 acquires the status information 31 each time print settings are modified. By executing the process in B12 through B21 only in the event of error conditions that prevent printing, the PC 1 can avoid a large increase in processing load while notifying the user of the latest status in the notification area 52 of the print settings screen D2. In other words, since the new status is displayed after an error has been resolved, the user can acquire information on the latest status prior to issuing a commando to execute a print (print execution command).

Figure 10:
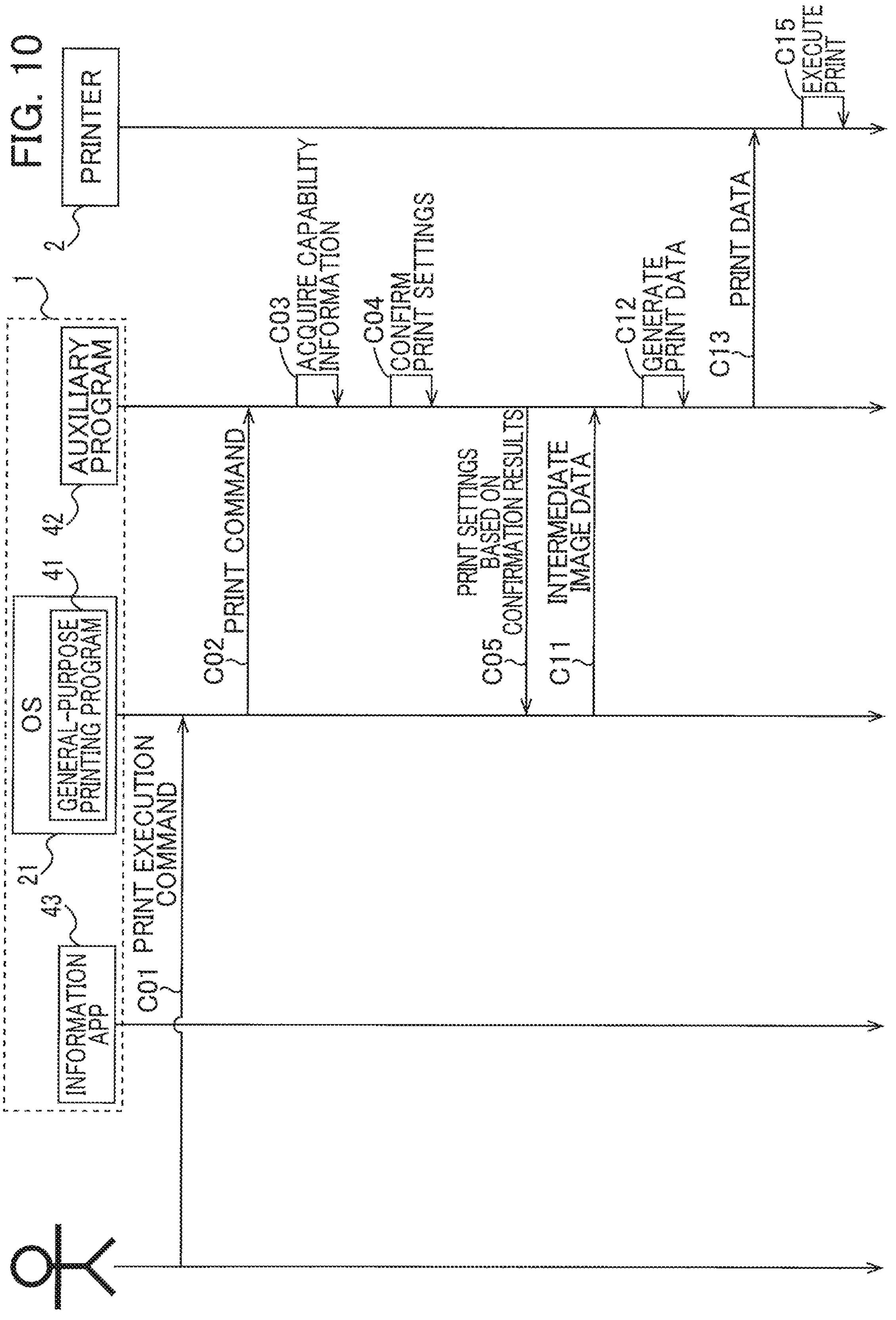
FIG. 10 is a sequence chart illustrating step showing an example of an operating procedure performed when a print execution command is received.

Next, the procedure performed by each program when the OS 21 receives the print execution command through a user operation on the Print button SW3 in the print settings screen D2 illustrated in FIG. 4 will be described with reference to the sequence chart in FIG. 10. The user may directly input the print execution command in the general-purpose printing program 41 or may input the print execution command in the information app 43, and the information app 43 may output a print command to the general-purpose printing program 41.

When the general-purpose printing program 41 receives the print execution command from the user in C01, in C02 the general-purpose printing program 41 starts up the auxiliary program 42 and issues a request to the auxiliary program 42 to perform a process corresponding to the print execution command. In C02 the auxiliary program 42 also receives information from the general-purpose printing program 41 indicating the print settings that have been set at the time of receipt of the print execution command. The general-purpose printing program 41 may also pass image data representing the image to be printed to the auxiliary program 42. The general-purpose printing program 41 also closes the currently displayed print settings screen D2, thereby making the information screen of the information app 43 active.

Upon receiving the print command, in C03 the auxiliary program 42 acquires capability information for the printer 2 that has been stored in A14 of FIG. 2. The auxiliary program 42 may also communicate with the printer 2 in order to acquire the capability information directly in C03. The capability information includes information on image processing available on the printer 2, for example. In C04 the auxiliary program 42 checks the information on the print settings received in C02 on the basis of the capability information acquired in C03. For example, the auxiliary program 42 confirms whether there are any discrepancies between the print settings and the capabilities of the printer 2. In C05 the auxiliary program 42 transfers information on the print settings based on the confirmation results to the general-purpose printing program 41.

The auxiliary program 42 may also modify the print settings based on the confirmation results of C04 before transferring the settings in C05. For example, when the print settings received in C02 include information on image processing that is more preferably performed on the printer 2 than by the general-purpose printing program 41 or auxiliary program 42, the auxiliary program 42 may modify the print settings to exclude that image processing. In such cases, the auxiliary program 42 may store information on the excluded print settings so that these print settings can be transferred to the printer 2 in a later step and in C05 may transfer information on the modified print settings to the general-purpose printing program 41.

The auxiliary program 42 may also reacquire the status information 31 in C03 when error information is stored in the memory 12. When the newly acquired status information 31 contains an error, the auxiliary program 42 may notify the user of the error before advancing to C05. Here, the auxiliary program 42 displays a popup window specifying the error on the display 13*a*, for example.

In C11 the general-purpose printing program 41 uses the print settings received from the auxiliary program 42 to generate intermediate image data by converting the format of image data for the image being printed to the format of the intermediate image data and transfers this intermediate image data to the auxiliary program 42. Since the information app 43 includes image data of various types, the general-purpose printing program 41 converts the image data to be printed to intermediate image data that is suitable for generating print data. When the image data to be printed is already suitable for generating print data, the general-purpose printing program 41 may skip the process to generate intermediate image data and may use the image data itself as the intermediate image data. One example of intermediate image data is XPS data.

In C12 the auxiliary program 42 executes rasterization based on the intermediate image data received in C1 to generate print data representing the image to be printed. The print data generated in C12 is in a format that the printer 2 can use for printing, such as page description language (abbreviated "PDL") data specific to the model of printer 2.

Since the auxiliary program 42 is designed to support the printer 2, the auxiliary program 42 has a higher degree of freedom in rasterization than the general-purpose printing program 41 and can more likely generate print data suited for printing on the printer 2. Note that the print data generated by the auxiliary program 42 may be of a format that can be used for printing on printer models other than the model of the printer 2.

In C13 the auxiliary program 42 transmits the print data generated in C12 to the printer 2 together with a print command instructing the printer 2 to execute a print. The process of C13 is an example of the (f) transmitting of the present disclosure. When the auxiliary program 42 has determined in C04 that a printing process should be executed on the printer 2, the auxiliary program 42 generates a print command that includes information for this process. The auxiliary program 42 may also notify the general-purpose printing program 41 when transmission of the print data is complete.

Upon receiving the print data and print command, in C15 the printer 2 prints an image of the print data based on the received print command, thereby generating printed matter.

The print data may be generated by the general-purpose printing program 41 rather than the auxiliary program 42. For example, the auxiliary program 42 may transfer the intermediate image data received in C11 and information on executing a print to the general-purpose printing program 41, and the general-purpose printing program 41 may generate print data by rasterizing the intermediate image data. In this case, the general-purpose printing program 41 transfers the generated print data to the auxiliary program 42. Upon receiving print data from the general-purpose printing program 41, the auxiliary program 42 transmits the print data to the printer 2 together with a print command instructing the printer 2 to execute a print.

Print data generated by the general-purpose printing program 41 is data in an image format that various printers can use for printing, such as PWG Raster data or PDF data. Performing rasterization on the general-purpose printing program 41 reduces the processing load on the auxiliary program 42, thereby avoiding an increase in processing time and reducing the size of the auxiliary program 42.

The general-purpose printing program 41 may also transmit the print data and print command to the printer 2. That is, the auxiliary program 42 may transfer the generated print data to the general-purpose printing program 41 to be sent from the PC 1 with the printer 2 as the destination. In this case, the general-purpose printing program 41 transmits the print data and the like received from the auxiliary program 42 to the printer 2. In this case, the process that the auxiliary program 42 transfer the print data and the like to the general-purpose printing program 41 is an example of the (f) transmitting of the present disclosure.

As described above, the auxiliary program 42 of the present embodiment acquires status information 31 for a printer 2 when the printer 2 is selected and transfers notification data based on the acquired status information 31 to the general-purpose printing program 41. As a result, the general-purpose printing program 41 displays an image based on the notification data in the notification area 52 of the print settings screen D2. Hence, a PC 1 employing a general-purpose printing program 41 that is standard in the OS 21 displays information related to the status of the printer 2 before a print command is given. Accordingly, the user can learn the status of the printer 2 before issuing a print command.

Further, in a case where the previous status has included an error when the auxiliary program 42 of the present embodiment is started up in response to user commands to modify the print settings, the auxiliary program 42 reacquires the status information and updates the notification data for display in the notification area 52 so that the user can learn the latest status.

There may also be limitations on information that can be displayed in the notification area 52 of the print settings screen D2. When a plurality of statuses is acquired and different statuses are provided with an order of priority, the auxiliary program 42 of the present embodiment gives precedence to information on statuses having a higher priority, thereby reducing the possibility of important or urgent notifications going unnoticed among the other notifications.

The embodiments disclosed in this specification are merely examples and are not intended to limit the present invention in any way. Therefore, it would be apparent to those skilled in the art that various improvements and modifications may be made to the technology disclosed in this specification without departing from the spirit of the disclosure. For example, the device connected to the PC 1 is not limited to a printer, but may be a multifunction peripheral, a copier, a fax machine, or any other device having a printing function. Further, the number of devices connected to the PC 1 may be any number of two or greater and is not limited to the example illustrated in the drawings.

The notification images illustrated in FIGS. 6 and 7 are merely examples, and the present disclosure is not limited to these sample images. Further, any of various wordings, object shapes, backgrounds, and the like may be displayed in the notification image.

Figure 9:
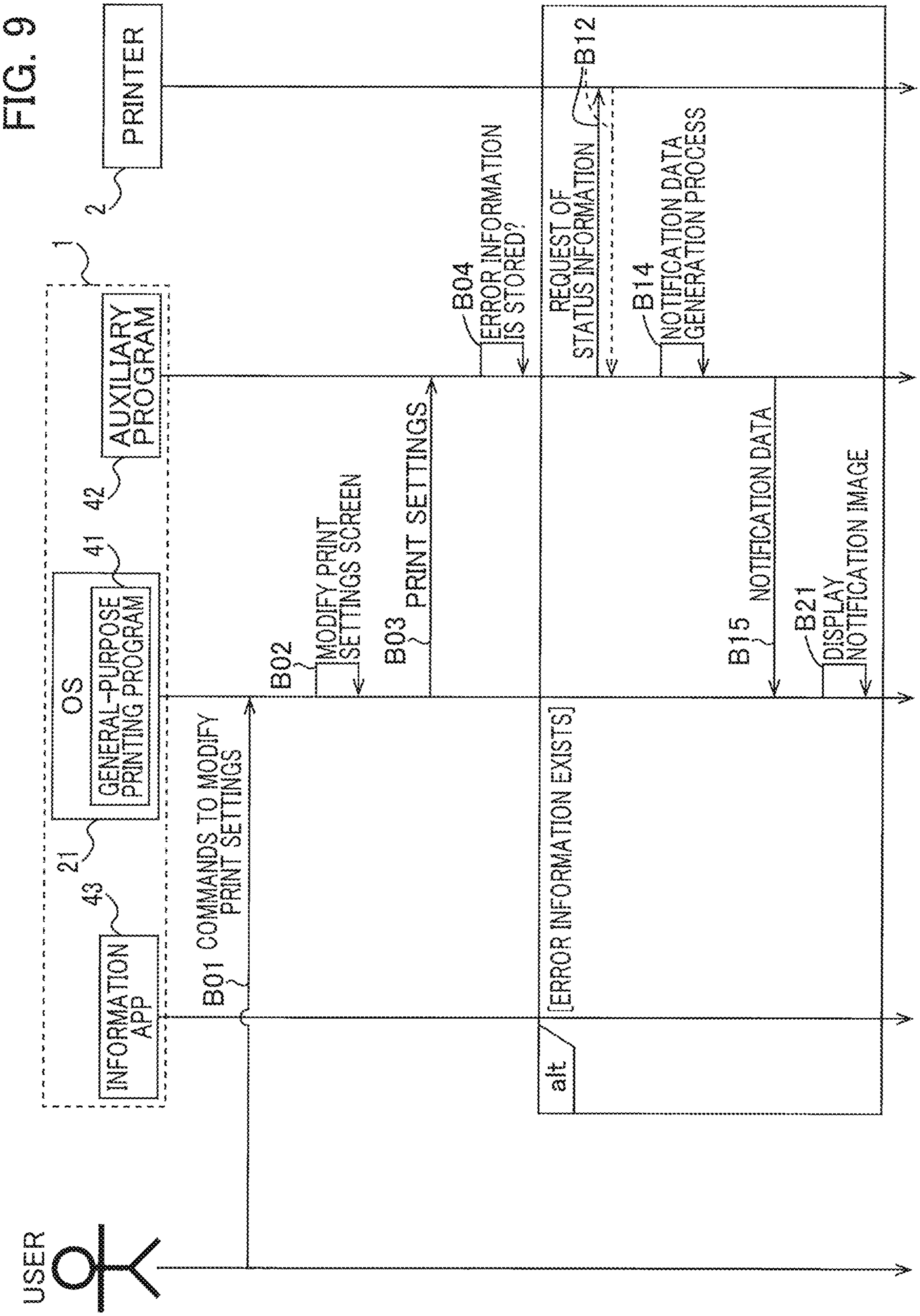
FIG. 9 is a sequence chart illustrating steps showing an example of an operating procedure performed when commands to modify print settings are received.

In the embodiment described above, the auxiliary program 42 reacquires status information in B12 of FIG. 9 when determining in B04 that the previous status has contained an error. However, the auxiliary program 42 need not reacquire the status information. In other words, the determination in B04 of FIG. 9 and the process from B12 through B21 may be omitted. Even if the user is only notified of the error when the printer is selected, the user will likely take steps to resolve that error. By not having the auxiliary program 42 reacquire status information, the PC 1 can shorten the preparation time for printing. On the other hand, reacquiring status information and notifying the user allows the user to know the latest information.

The general-purpose printing program 41 may also start up the auxiliary program 42 when the OS 21 changes the default printer from another printer to the printer 2 in response to the user performing an operation after the general-purpose printing program 41 displays the print settings screen D2. In this case, the auxiliary program 42 may execute the notification data generation process and transfer notification data to the general-purpose printing program 41 as when the printer 2 is selected in the above embodiment.

In the embodiment described above, only printing operations have been described in detail as the operations of the auxiliary program 42, but the auxiliary program 42 may have other roles. Further, the program that executes the processes described in the embodiment is not limited to the auxiliary program 42 but may be another program that receives instructions from the OS 21 or the general-purpose printing program 41 when printing is performed using the general-purpose printing program 41. For example, a print workflow application program having specifications published by Microsoft Corporation may be used as the program.

The execution timing of the auxiliary program 42 is not limited to the examples in the embodiment. For example, the auxiliary program 42 may be executed in response to execution instructions received directly from the OS 21. Alternatively, the auxiliary program 42 may be a resident program, in which case the auxiliary program 42 may perform the operations described above upon receiving an execution command.

In any of the sequence charts and flowcharts disclosed in the embodiments, the plurality of processes that make up any of the plurality of steps may be executed in parallel, or the order in which the processes are performed may be modified in any way that does not produce any inconsistencies in the processes.

The processes disclosed in the embodiment may be executed by a single CPU, a plurality of CPUs, an ASIC or other hardware, or a combination of these components. Further, the processes disclosed in the embodiments may be achieved through a storage medium that stores the programs used to implement those processes or according to any of various other methods or formats.

What is claimed is:

1. A non-transitory computer-readable storage medium storing a support program for an information processing device communicable with a printer, the information processing device including: a display; a computer; and a memory storing an operating system in which a general-purpose printing program for printing is embedded, the general-purpose printing program being configured to manage data for displaying a print settings screen on the display, the support program corresponding to the printer and supporting the general-purpose printing program, the support program being not included in the operating system, the support program, when executed by the computer, causing the information processing device to perform:

when a request to perform a process is issued from the general-purpose printing program in a state where the printer is selected:

(a) acquiring status information indicating a status of the printer;

(b) generating notification data based on the status information acquired in the (a) acquiring, the notification data indicating a notification content to be displayed, where the notification content includes one or more of text, a still image, a video, or an object having a link with an embedded URL; and (c) transferring, to the general-purpose printing program, the notification data generated in the (b) generating to display the notification content based on the notification data on the print settings screen displayed on the display.

2. The non-transitory computer-readable storage medium according to claim 1, wherein the (a) acquiring comprises:

(a-1) issuing a capabilities acquisition request to the general-purpose printing program; and (a-2) acquiring the status information from capability information transferred from the general-purpose printing program, and wherein the general-purpose printing program, when executed by the computer, causes the information processing device to perform: transmitting, in response to the capabilities acquisition request, a capabilities transmission request to the printer; receiving the capability information from the printer; and transferring the capability information to the support program, and the printer is configured to transmit, in response to the capabilities transmission request, the capability information including the status information to the information processing device.

3. The non-transitory computer-readable storage medium according to claim 1, wherein the (a) acquiring comprises:

(a-3) transmitting a status transmission request to the printer; and (a-4) acquiring the status information transmitted from the printer, and wherein the printer is configured to transmit, in response to the status transmission request, the status information to the information processing device.

4. The non-transitory computer-readable storage medium according to claim 1, wherein the support program, when executed by the computer, causes the information processing device to further perform:

when a request to perform a process is issued from the general-purpose printing program in response to a print setting displayed in the print settings screen being modified:

(d) determining whether a previous status is an error, the previous status being the status of the printer indicated by previous status information, the previous status information being the status information acquired in the previously performed (a) acquiring; and in response to determining that the previous status is the error, performing the (a) acquiring, the (b) generating, and the (c) transferring.

5. The non-transitory computer-readable storage medium according to claim 1, wherein the memory is configured to store an order of priority for a plurality of statuses, wherein the status indicated by the status information includes one or more statuses, and wherein the (b) generating comprises:

(b-1) determining whether the status indicated by the status information includes more than one status; and (b-2) generating, in response to determining that the status includes a plurality of statuses, the notification data indicating the notification content for notifying a user of the plurality of statuses based on the order of priority stored in the memory, the plurality of statuses including a first status having a first priority and a second status having a second priority higher than the first priority, the notification content giving precedence to the second status over the first status.

6. The non-transitory computer-readable storage medium according to claim 1, wherein the (b) generating comprises:

(b-3) determining whether the status is an error; and (b-4) generating, in response to determining that the status is an error, the notification data including guidance information indicating a procedure for resolving the error.

7. The non-transitory computer-readable storage medium according to claim 6, wherein the error is one of paper jam, no paper, no colorant, or cover open.

8. The non-transitory computer-readable storage medium according to claim 1, wherein the support program, when executed by the computer, causes the information processing device to further perform:

when a request to perform a process is issued from the general-purpose printing program in response to a print execution command issued from an application program stored in the memory and instructing the general-purpose printing program to cause the printer to print an image:

(e) acquiring intermediate image data from the general-purpose printing program, the intermediate image data representing the image; and (f) transmitting print data generated based on the intermediate image data to the printer.

* * * * *